(12) United States Patent
Cederløf et al.

(10) Patent No.: US 7,351,873 B2
(45) Date of Patent: Apr. 1, 2008

(54) CONTINUOUS PROCESS TO SEPARATE COLOUR BODIES AND/OR ASPHALTHENIC CONTAMINANTS FROM A HYDROCARBON MIXTURE

(75) Inventors: Gro Cederløf, Amsterdam (NL); Eduard Rudolf Geus, Amsterdam (NL)

(73) Assignee: Shell Oil Company, Houston, TX (US)

( * ) Notice: Subject to any disclaimer, the term of this patent is extended or adjusted under 35 U.S.C. 154(b) by 686 days.

(21) Appl. No.: 10/492,812

(22) PCT Filed: Oct. 18, 2002

(86) PCT No.: PCT/EP02/11712

§ 371 (c)(1), (2), (4) Date: Apr. 16, 2004

(87) PCT Pub. No.: WO03/035803

PCT Pub. Date: May 1, 2003

(65) Prior Publication Data

US 2004/0249232 A1 Dec. 9, 2004

(30) Foreign Application Priority Data

Oct. 18, 2001 (EP) ................... 01402702

(51) Int. Cl.
*B01D 61/00* (2006.01)
*C07C 4/04* (2006.01)
*C07C 7/144* (2006.01)

(52) U.S. Cl. ............ 585/818; 585/648; 210/637; 210/651

(58) Field of Classification Search ............... 210/637, 210/651; 585/818, 648
See application file for complete search history.

(56) References Cited

U.S. PATENT DOCUMENTS

| | | | |
|---|---|---|---|
| 3,250,701 A | 5/1966 | Watson et al. | 210/22 |
| 3,992,301 A | 11/1976 | Shippey et al. | 210/23 |
| 4,411,790 A * | 10/1983 | Arod et al. | 210/637 |
| 4,814,088 A | 3/1989 | Kutowy et al. | 210/651 |
| 4,986,918 A * | 1/1991 | Breslau et al. | 210/652 |
| 5,256,297 A | 10/1993 | Feimer et al. | 210/651 |

FOREIGN PATENT DOCUMENTS

| | | |
|---|---|---|
| FR | 2180446 | 11/1973 |
| WO | 96/27430 | 9/1996 |
| WO | 99/27036 | 6/1999 |
| WO | WO 9927036 * | 6/1999 |
| WO | WO 200110540 A2 * | 2/2001 |

OTHER PUBLICATIONS

International Search Reported mailed Feb. 7, 2003.

* cited by examiner

*Primary Examiner*—Glenn Caldarola
*Assistant Examiner*—Randy Boyer
(74) *Attorney, Agent, or Firm*—William E. Hickman

(57) ABSTRACT

A continuous process to separate color bodies and/or asphalthenic contaminants from a hydrocarbon mixture by passing part of the hydrocarbon mixture through a membrane over which membrane a pressure difference is maintained thereby obtaining a hydrocarbon permeate having a reduced content of color bodies and/or contaminants, wherein at regular time intervals the pressure difference over the membrane is substantially lowered.

25 Claims, 1 Drawing Sheet

Figure 1:
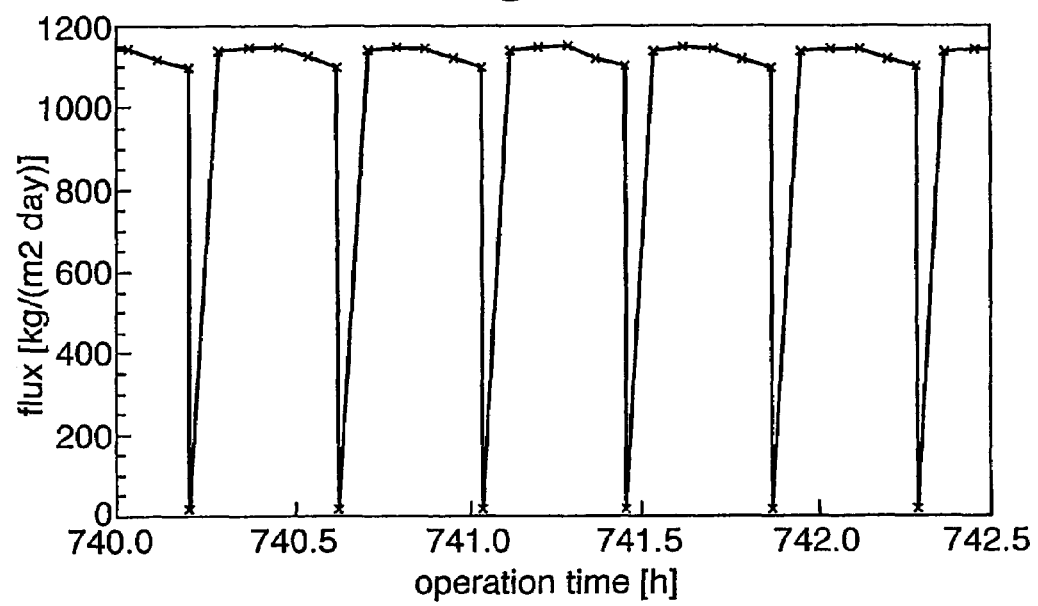

CONTINUOUS PROCESS TO SEPARATE COLOUR BODIES AND/OR ASPHALTHENIC CONTAMINANTS FROM A HYDROCARBON MIXTURE

The invention is directed to a continuous process to separate colour bodies and/or asphalthenic contaminants from a hydrocarbon mixture by passing part of the hydrocarbon mixture through a membrane due to a pressure difference across the membrane thereby obtaining a hydrocarbon permeate having a reduced content of colour bodies and/or contaminants.

Such a process is known from WO-A-9927036. This publication discloses a process for preparing lower olefins by means of the well-known steam cracking process from a contaminated feedstock. Prior to feeding the feedstock to the steam cracker furnaces the contaminants are removed from the feedstock by means of a membrane separation. By removing contaminants from the feed in this manner it is possible to use, for example, so-called black condensates as feedstock for preparing lower olefins. Black condensates are contaminated natural gas condensates having an ASTM colour of 3 or more. Direct application of these relatively cheap feedstocks in the above steam cracker process would not be possible because the contaminants and/or colour bodies in the feed would give rise to excessive coke formation in the steam cracker furnaces and associated convection sections.

A disadvantage of the process according to WO-A-9927036 is that the flux, expressed in feed permeating through the membrane per square meter per day decreased quickly from a maximum value of around for example 1200 $kg/m^2$.day to non-economical lower values.

The object of the present invention is to provide a process, which can be operated over a prolonged time period at a high average flux.

This object is achieved with the following process. Continuous process to separate colour bodies and/or asphalthenic contaminants from a hydrocarbon mixture by passing part of the hydrocarbon mixture through a membrane, over which membrane a pressure difference is maintained, thereby obtaining a hydrocarbon permeate having a reduced content of colour bodies and/or contaminants, wherein at regular time intervals the pressure difference over the membrane is substantially lowered.

Applicants observed that the flux would decrease from a maximum value to a lower value. By reducing the pressure difference when the flux reached a certain minimal acceptable value it was found possible to operate the membrane separation at the original maximum flux when the membrane separation was resumed again. Thus a simple process was obtained which did not require the more complex back flushing operation. Back flushing is sometimes used to improve the flux over a membrane. A disadvantage is that it is more complex to control and it requires for example more equipment such as back flushing pumps and will produce more of an unwanted black by-product. Also, in the case that the membrane is formed by a thin top layer made of a dense membrane and a support layer made of a porous membrane, back flushing of permeate can cause damage of the thin dense membrane. Further advantages and preferred embodiments will be described below.

The hydrocarbon mixtures will contain contaminants and/or colour bodies, which will give the hydrocarbon mixture a darkish colour. The process of this invention is especially directed to hydrocarbon mixtures having an ASTM colour of 3 or more as determined in accordance with ASTM D1500. The ASTM colour of the permeate is found to be lower than 2 and sometimes even lower than 1, depending on the colour of the hydrocarbon feed and operating conditions of the membrane process.

The contaminants and/or colour bodies are typically hydrocarbons with high boiling points and which do not easily vaporise, even in the presence of steam. Examples of such hydrocarbons are polynuclear aromatics, polynuclear cycloparaffins, large paraffinic hydrocarbons (waxes), and olefinic components such as polynuclear cycloolefins and large olefinic hydrocarbons specially diolefins.

The hydrocarbon mixtures to be used in the process according to the present invention are suitably hydrocarbon mixtures having an initial boiling point of greater than 20° C. and a 95% recovery point of less than 600° C. preferable with a 95% recovery point of less than 450° C., and more preferable a 95% recovery point of less than 350° C. determined by ASTM D-2887. Such hydrocarbon mixtures can be crude petroleum fractions, (contaminated) natural gas condensates or (contaminated) refinery streams. An example of a suitable hydrocarbon mixture is a naphtha fraction, which has been contaminated in the storage tank or in the pipeline when transporting said fraction from a refinery to a steam cracker. Another example of a hydrocarbon mixture, which may suitably be used, is the above referred to black condensate, which is a contaminated natural gas condensate. The natural gas condensates normally have a ASTM colour of below 1. Contamination occurs when such gas condensates are stored in storage vessels or transported via pipelines through which also, for example, crude oils are stored/transported. Natural gas condensates are typically mixtures comprising substantially, i.e. more than 90 wt %, of $C_5$ to $C_{20}$ hydrocarbons or more typically $C_5$ to $C_{12}$ hydrocarbons.

The membrane suitably comprises a top layer made of a dense membrane and a base layer (support) made of a porous membrane. The membrane is suitably so arranged that the permeate flows first through the dense membrane top layer and then through the base layer, so that the pressure difference over the membrane pushes the top layer onto the base layer. The dense membrane layer is the actual membrane which separates the contaminants from the hydrocarbon mixture. The dense membrane, which is well known to one skilled in the art, has properties such that the hydrocarbon mixture passes said membrane by dissolving in and diffusing through its structure. Preferably the dense membrane layer has a so-called cross-linked structure as for example described in WO-A-9627430. The thickness of the dense membrane layer is preferably as thin as possible. Suitably the thickness is between 1 and 15 micrometer, preferably between 1 and 5 micrometer. The contaminants and colour bodies are not capable to dissolve in said dense membrane because of their more complex structure and high molecular weight. For example, suitable dense membranes can be made from a polysiloxane, in particular from poly(di-methyl siloxane) (PDMS). The porous membrane layer provides mechanical strength to the membrane. Suitable porous membranes are PolyAcryloNitrile (PAN), PolyAmideImide+$TiO_2$ (PAI) and PolyEtherImide (PEI), and can be of the type commonly used for ultrafiltration, nanofiltration or reverse osmosis.

The process according to the invention comprises first time periods at which the actual separation takes place and a high flux is achieved, alternated with second time periods at which the pressure difference over the membrane is substantially lowered when compared to the first time periods. After the second time periods it was found possible to operate the membrane separation at substantially the original high flux again, without significant deterioration over prolonged times of operation. Without wanting to limit the invention in any manner, it is believed that the following mechanism contributes to prevent degrading membrane performance due to deposits of colour bodies and/or asphaltenic contaminants on the membrane surface. During operation, the dense membrane is swollen significantly, due to the hydrocarbon that is dissolved in and diffusing through the membrane. I.e. the thickness of the dense membrane is increased during operation, although the swelling is somewhat counteracted by the pressure difference over the membrane. When the pressure difference is significantly lowered, it is believed that the dense membrane can expand so that its thickness increases, thereby loosening any deposits on the membrane surface.

During separation the pressure difference across the membrane is preferably between 5 and 60 bar and more preferably between 10 and 30 bar. During the time interval at which the pressure difference is lowered the pressure difference is preferably between 0 and 5 bar, more preferably below 1 bar and most preferably 0 bar.

The pressure difference can be suitably achieved by operating pumping means upstream and/or downstream the membranes. In a preferred embodiment of the invention the lowering of the pressure at regular intervals is achieved by stopping the flow of contaminated hydrocarbon mixture to the membrane. This can be achieved by stopping the pumping means. Stopping and activating pumping means is not always desirable. In a situation wherein the pressure difference is achieved by at least an upstream pump it can be desirable to recycle the hydrocarbon mixture from a position between the operating pump and the membrane to a position upstream the operating pump without stopping the pump. In this manner the flow to the membrane can be temporarily discontinued while the pump can remain in its operating mode. Alternatively one upstream pumping means can provide a hydrocarbon mixture feed to more than one parallel operating membrane separator or one or more parallel operating groups of parallel operating membrane separators, each separator or group of separators provided with an individual valve to interrupt the feed to said separator or group of separators. By closing and opening in a sequential manner the separate valves the (groups of) membrane separators can be operated according to the process of the present invention without having to stop the upstream pump.

The above-described and parallel-operated (groups of) separators comprise a single separation step. Embodiments comprising two or more sequential separation steps, wherein the retentate of a first separation step is used as the feed for a second separation step, are preferred.

One skilled in the art can easily determine the optimal time periods of continuous separation and the time periods at which the pressure difference is substantially lower. Maximising the average flux over the membrane separator will drive such determination. With average flux is here meant the average flux over both separation and intermediate time periods. Thus it is desirable to minimise the time periods at which the pressure is substantially lower and maximising the time period at which separation takes place. The flux will decrease in the separation intervals and suitably when the flux becomes less than 75-99% of its maximum value the separation interval is stopped. Suitably between 5 and 480 minutes of continuous separation across the membrane alternates with time periods of between 1 and 60 minutes, preferably below 30 minutes and more preferably below 10 minutes and most preferably below 6 minutes of at which the pressure difference is substantially lowered.

The membrane separation is suitably carried out at a temperature in the range of from −20 to 100° C., in particular 10 to 100° C., and suitably at 40° C. The wt % recovery of permeate on feed is preferably between 50 and 97 wt % and more preferably between 80 and 95 wt %.

The process according to the invention is suitable to be used to separate contaminants from a feed, especially the referred to black condensates, for a steam cracker of which WO-A-9927036 describes an example. The retentate which contains an increased concentration of contaminants may be supplied to the fractionation column downstream the steam cracker furnaces. Preferably the retentate is supplied to a crude distillation column of a refinery because the various components of the retentate are also found in the crude petroleum feedstock normally supplied to said crude distillation column.

The invention will be described by means of the following non-limiting examples.

EXAMPLE 1

A black condensate having the properties as listed in Table 1 was fed at a rate of 100 kg/hour to a membrane separation unit at 40° C. which was provided with 1.5 m² of a PDMS/PAN 150 membrane as obtained from GKSS Forschungszentrum GmbH (a company having its principal office in Geesthacht, Germany) comprising a top layer of PolyDiMethylSiloxane (PDMS) and a supporting layer of a PolyAcryloNitrile (PAN). The pressure difference when separating was 25 bar. This pressure was alternated by periods at which the feed was stopped resulting in a pressure difference of 0 bar. Experiment 1 was started at an operation time readout of 740 hours, and the flux across the membrane during the first 2.5 hours of the experiment was as shown in FIG. 1. The colour properties of the permeate was an ASTM colour of less than 2.

The procedure as described above was subsequently continued for more than 400 hours, and the flux across the membrane vs. time remained the same as in the first 2.5 hours shown in FIG. 1. The average flux therefore did not decrease.

TABLE 1

| properties black condensate | |
| --- | --- |
| density at 15° C., kg/m³ | 750 |
| IBP ° C. | <36 |
| 95 vol % BP ° C. | 302 |
| ASTM Colour (ASTM D1500) | 8 |

COMPARATIVE EXAMPLE

Figure 2:
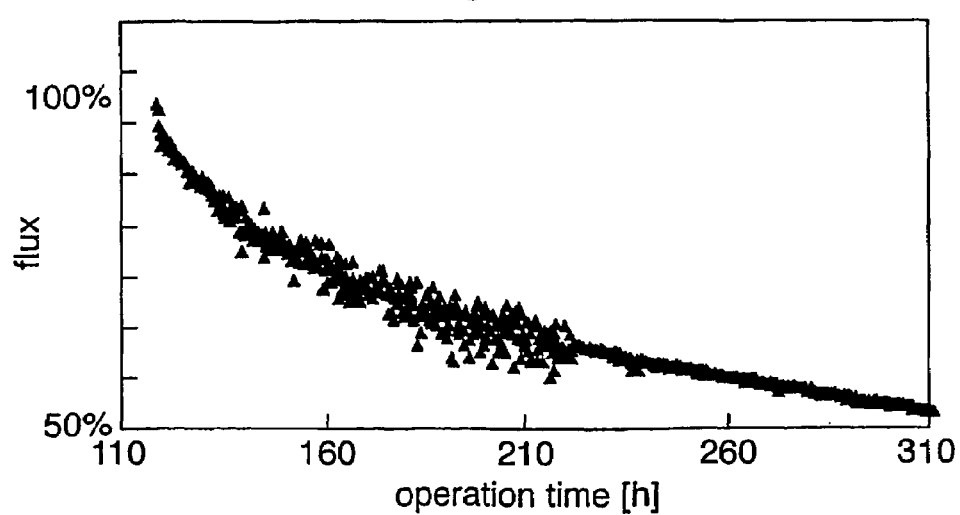

Example 1 can be compared with the results of a similar test campaign wherein the same membranes and the same condensate feed was used. The feed differential pressure over the membrane was 20 bar, temperature 40° C., feed rate 80 kg/h. The flux across the membrane in the comparative example is shown in FIG. 2. The comparative example was started at an operation time readout of 120 hours. The flux reduced to some 50% of the initial flux during the first 200 hours of operation. The flux did not reach a steady state condition.

This Experiment shows that even with a lower pressure differential over the membrane a decrease in the flux is experienced when the on-off mode of the process of the present invention is not applied. If this Experiment was performed under the same pressure and feed rate conditions as Example 1 an even quicker decrease in flux would have been observed.

As briefly pointed out in the introduction, the present invention can for example be used with particular advantage in a process of producing light olefins from a liquid hydrocarbon feed by means of thermal cracking, as known from WO-A-9927036. The known process comprises the steps of (a) supplying the feed to the inlet of a membrane unit provided with a membrane, and removing from the permeate side a permeate and from the retentate side a retentate;

(b) supplying the permeate to the inlet of a cracking furnace, allowing the permeate to crack in the coils of the cracking furnace in the presence of steam at elevated temperature and removing from the cracking furnace a cracked stream which is enriched in light olefins;

(c) quenching the cracked stream;

(d) supplying the cooled cracked stream to a fractionation column;

(e) supplying the retentate to the fractionation column; and (f) removing from the top of the fractionation column a gaseous stream, from the side of the fractionation column a side stream of fuel oil components and from the bottom of the fractionation column a bottom stream.

Such a process is also called steam cracking, naphtha cracking or ethylene manufacturing.

The fractionation column is also called 'primary fractionator'.

The gaseous stream removed from the top of the fractionation column comprises light olefins, such as ethylene and propylene, and other components, such as hydrogen, methane, C4 products and pyrolysis gasoline (C5+). Downstream of the fractionation column, the gaseous overhead is further treated to recover ethylene.

From the side of the fractionation column one or more side stream(s) is (are) removed which contains fuel oil components.

From the bottom of the fractionation column is removed a liquid bottom stream which contains heavy cracked fuel oil. Part of the liquid bottom stream is cooled and mixed with the cracked stream upstream of the fractionation column to quench this stream. The remainder is removed as heavy fuel oil.

Upstream of the fractionation column the feed is cracked in the cracking furnace. The liquid hydrocarbon feed is preheated upstream of the cracking furnace or inside the upper part of the cracking furnace. In the cracking furnace the liquid hydrocarbon stream is first vaporized and subsequently cracked. Vaporization of the liquid hydrocarbon stream takes place in the presence of steam in a vaporization coil located in the upper part of the cracking furnace, where the liquid is vaporized by the heat from the hot flue gas. The upper part of the cracking furnace is called the convection section. After the stream is vaporized, it enters into the pyrolysis coil in the radiant section of the cracking furnace. In the pyrolysis coil hydrocarbons are cracked in the presence of steam to obtain the desired product. This is well known, and the conditions for vaporization and cracking are well known as well.

Feeds that are used are naphtha (a straight-run gasoline fraction) and/or gas oil (a distillate, intermediate in character between kerosene and light lubricating oils). Such feeds, however, tend to become more expensive, and this triggers the interest in using other hydrocarbon feeds for the cracking process. Examples of such feeds are certain condensates which comprise naphtha and gas oil components. Condensate is a mixture of hydrocarbons which are sometimes produced with natural gas.

These feeds, however, also contain contaminants. Two contaminants are of particular relevance. On the one hand hydrocarbons with a high boiling point and on the other hand salts present in water droplets which are dispersed in the stream of light hydrocarbons.

Hydrocarbons with a high boiling points are hydrocarbons which do not easily vaporize, even in the presence of steam. Examples of such hydrocarbons are polynuclear aromatics, polynuclear cycloparaffins, large paraffinic hydrocarbons (waxes), and olefinic components such as polynuclear cycloolefins and large olefinic hydrocarbons specially diolefins. These high boiling point hydrocarbons are soluble in the light hydrocarbons, and the solution usually has a darker colour for example an ASTM colour of 3 or more, determined in accordance with ASTM D1500. An example of a contaminated liquid stream containing light hydrocarbons is a black condensate, which is a mixture of hydrocarbons which are sometimes produced with natural gas having an ASTM colour of 3 or more. The contaminated liquid may also include waste streams for the refinery.

The salts in the hydrocarbon streams will come from formation water or from other treatments at a refinery, examples of contaminating salts are sodium chloride, magnesium chloride, calcium chloride and iron chloride. Other salts, such as sulphates may be present as well.

The membrane separation step of the known process serves to remove the contaminants from the feed. If the contaminants are not removed, they will remain liquid in the vaporization coil, and will foul the inner surface of the vaporization coil. Fouling by deposited components will reduce the heat transfer and will consequently adversely affect the performance of a steam cracker. Moreover, fouling can even cause plugging of the vaporization coil. In the known process therefore fouling of the vaporization coil is reduced.

The known process can be improved by making use of the present invention in order that it can be operated over a significantly prolonged time period at a high average flux.

Using the present invention this can be achieved by replacing the feed supply and membrane separation step of the known process by the step of supplying the feed to the inlet of a membrane unit provided with a membrane, over which membrane a pressure difference is maintained thereby obtaining at the permeate side of the membrane a permeate having a reduced content of colour bodies and/or contaminants, and at the retentate side of the membrane a retentate, and removing the permeate and the retentate from the membrane, wherein at regular time intervals the pressure difference over the membrane is substantially lowered.

Accordingly, the present invention further provides a process according to any one of claims 1-13, wherein the hydrocarbon mixture is a liquid hydrocarbon feed from which light olefins are to be produced by thermal cracking, wherein the membrane forms part of a membrane separation unit in which the hydrocarbon permeate is removed from the permeate side of the membrane, and wherein a retentate is removed from the retentate side of the membrane, and wherein the process further comprises the steps of (a) supplying the permeate to the inlet of a cracking furnace, allowing the permeate to crack in the coils of the cracking furnace in the presence of steam at elevated temperature and removing from the cracking furnace a cracked stream which is enriched in light olefins;

(b) quenching the cracked stream;

(c) supplying the cooled cracked stream to a fractionation column;

(d) supplying the retentate to the fractionation column; and (e) removing from the top of the fractionation column a gaseous stream, from the side of the fractionation column a side stream of fuel oil components and from the bottom of the fractionation column a bottom stream.

Suitably, the membrane in step (a) comprises a dense membrane layer as described hereinbefore, which allows hydrocarbons from the feed, but not asphaltenes or color bodies to pass through the membrane by dissolving in and diffusing through its structure. Such a membrane is suitably also used, when the hydrocarbon feed further contains salt contaminants, which are present in water droplets that are dispersed in the hydrocarbon feed. The water and/or salt will normally not be dissolved in the dense membrane, and therefore the permeate will be free from salt.

The membrane separation is carried out at a temperature in the range of from 10 to 100° C. and suitably at 40° C., and the mass ratio between permeate and retentate is between 1 and 100, and suitably between 5 and 20. Examples of further details about the operation of the membrane are given in the description hereinbefore and in Example 1. Details about the cracking process are given in the example disclosed in WO-A-9927036.

We claim:

1. A continuous process to separate colour bodies and/or asphaltenic contaminants from a hydrocarbon mixture by passing part of the hydrocarbon mixture through a membrane over which membrane a pressure difference is maintained thereby obtaining a hydrocarbon permeate having a reduced content of colour bodies and/or contaminants, wherein at regular time intervals the pressure difference over the membrane is substantially lowered, wherein during the process the pressure difference is maintained at a level of zero (0) or greater, wherein the pressure difference is substantially lowered by stopping the flow to the membrane.

2. The process of claim 1, wherein the membrane comprises a top layer made of a dense membrane and a support layer made of a porous membrane.

3. The process of claim 2, wherein the dense membrane is made from a polysiloxane such as a poly(di-methyl siloxane).

4. The process of claim 3, wherein the pressure difference across the membrane is between 5 and 60 bar during separation and between 0 and 5 bar when the pressure difference is lowered at the regular time intervals.

5. The process of claim 4, wherein the pressure difference across the membrane during separation is between 10 and 30 bar.

6. The process of claim 5, wherein at regular time intervals the pressure difference is lowered to 0 bar.

7. The process of claim 6, wherein time periods of between 5 and 480 minutes of continuous separation across the membrane alternates with time periods of between 1 and 60 minutes of at which the pressure difference is substantially lowered.

8. The process of claim 7, wherein the time period at which the pressure difference is substantially lowered is below 30 minutes.

9. The process of claim 8, wherein the pressure difference is substantially lowered by stopping the flow to the membrane.

10. The process of claim 9, wherein at least part of the pressure difference across the membrane results from a pump upstream from the membrane and wherein the pressure difference is lowered at regular time intervals by recycling the hydrocarbon mixture from a position between the operating pump and the membrane to a position upstream from the operating pump.

11. The process of claim 10, wherein the hydrocarbon mixture has an initial boiling point greater than 20.degree. C. and a 95% recovery point of less than 600.degree. C., determined by ASTM D2887.

12. The process of claim 11, wherein the hydrocarbon mixture has an ASTM colour of above 3 according to ASTM D1500.

13. The process of claim 12, wherein the hydrocarbon mixture is a contaminated natural gas condensate or a contaminated refinery stream.

14. The process of claim 13, wherein the hydrocarbon mixture is a liquid hydrocarbon feed from which light olefins are to be produced by thermal cracking, wherein the membrane forms part of a membrane separation unit in which the hydrocarbon permeate is removed from the permeate side of the membrane, and wherein a retentate is removed from the retentate side of the membrane, and wherein the process further comprises the steps of (a) supplying the permeate to the inlet of a cracking furnace, allowing the permeate to crack in the coils of the cracking furnace in the presence of steam at elevated temperature and removing from the cracking furnace a cracked stream which is enriched in light olefins; (b) quenching the cracked stream; (c) supplying the cooled cracked stream to a fractionation column; (d) supplying the retentate to the fractionation column; and (e) removing from the top of the fractionation column a gaseous stream, from the side of the fractionation column a side stream of fuel oil components and from the bottom of the fractionation column a bottom stream.

15. The process of claim 1, wherein the pressure difference across the membrane is between 5 and 60 bar during separation and between 0 and 5 bar when the pressure difference is lowered at the regular time intervals.

16. The process of claim 2, wherein the pressure difference across the membrane is between 5 and 60 bar during separation and between 0 and 5 bar when the pressure difference is lowered at the regular time intervals.

17. The process of claim 1, wherein at regular time intervals the pressure difference is lowered to 0 bar.

18. The process of claim 2, wherein at regular time intervals the pressure difference is lowered to 0 bar.

19. The process of claim 3, wherein at regular time intervals the pressure difference is lowered to 0 bar.

20. The process of claim 4, wherein at regular time intervals the pressure difference is lowered to 0 bar.

21. The process-of claim 1, wherein time periods of between 5 and 480 minutes of continuous separation across the membrane alternates with time periods of between 1 and 60 minutes of at which the pressure difference is substantially lowered.

22. The process-of claim 2, wherein time periods of between 5 and 480 minutes of continuous separation across the membrane alternates with time periods of between 1 and 60 minutes of at which the pressure difference is substantially lowered.

23. The process-of claim 3, wherein time periods of between 5 and 480 minutes of continuous separation across the membrane alternates with time periods of between 1 and 60 minutes of at which the pressure difference is substantially lowered.

24. The process-of claim 4, wherein time periods of between 5 and 480 minutes of continuous separation across the membrane alternates with time periods of between 1 and 60 minutes of at which the pressure difference is substantially lowered.

25. The process-of claim 5, wherein time periods of between 5 and 480 minutes of continuous separation across the membrane alternates with time periods of between 1 and 60 minutes of at which the pressure difference is substantially lowered.

* * * * *